(12) United States Patent
Zhang et al.

(10) Patent No.: US 12,045,713 B2
(45) Date of Patent: Jul. 23, 2024

(54) DETECTING ADVERSARY ATTACKS ON A DEEP NEURAL NETWORK (DNN)

(71) Applicant: International Business Machines Corporation, Armonk, NY (US)

(72) Inventors: Jialong Zhang, White Plains, NY (US); Zhongshu Gu, Ridgewood, NJ (US); Jiyong Jang, Chappaqua, NY (US); Marc Philippe Stoecklin, Zurich (CH); Ian Michael Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 16/950,684

(22) Filed: Nov. 17, 2020

(65) Prior Publication Data

US 2022/0156563 A1    May 19, 2022

(51) Int. Cl.
*G06N 3/063* (2023.01)
*G06F 18/214* (2023.01)
*G06F 18/2433* (2023.01)
*G06N 3/082* (2023.01)
*G06N 3/048* (2023.01)

(52) U.S. Cl.
CPC ............ *G06N 3/063* (2013.01); *G06F 18/214* (2023.01); *G06F 18/2433* (2023.01); *G06N 3/082* (2013.01); *G06N 3/048* (2023.01)

(58) Field of Classification Search
CPC ........ G06N 3/063; G06N 3/082; G06N 3/048; G06N 3/045; G06N 20/00; G06N 3/08; G06N 3/047; G06N 3/084; G06F 18/214; G06F 18/2433; G06F 21/554; G06F 21/552; G06F 2221/033; G06V 10/82
See application file for complete search history.

(56) References Cited

U.S. PATENT DOCUMENTS

| | | |
|---|---|---|
| 2004/0059947 A1 | 3/2004 | Lee |
| 2008/0083029 A1 | 4/2008 | Yeh et al. |
| 2015/0195296 A1 | 7/2015 | Vasseur |

(Continued)

OTHER PUBLICATIONS

Metzen, et al., "On detecting adversarial perturbations," ICLR, 2017.

(Continued)

*Primary Examiner* — Brent Johnston Hoover
(74) *Attorney, Agent, or Firm* — Anthony M. Pallone (57) ABSTRACT

A method, apparatus and computer program product to protect a deep neural network (DNN) having a plurality of layers including one or more intermediate layers. In this approach, a training data set is received. During training of the DNN using the received training data set, a representation of activations associated with an intermediate layer is recorded. For at least one or more of the representations, a separate classifier (model) is trained. The classifiers, collectively, are used to train an outlier detection model. Following training, the outliner detection model is used to detect an adversarial input on the deep neural network. The outlier detection model generates a prediction, and an indicator whether a given input is the adversarial input. According to a further aspect, an action is taken to protect a deployed system associated with the DNN in response to detection of the adversary input.

18 Claims, 3 Drawing Sheets

(56) References Cited

U.S. PATENT DOCUMENTS

2019/0238568 A1* 8/2019 Goswami .............. G06F 21/566
2021/0342652 A1* 11/2021 Glassman ............. G06F 18/251

OTHER PUBLICATIONS

Xu et al., "Feature squeezing: detecting adversarial examples in deep neural networks," Network and Distributed Systems Security Symposium (NDSS), Feb. 2018.

Papernot, et al., "Deep k-nearest neighbors: towards confident, interpretable, and robust deep learning," arXiv:1803.04765, Mar. 2018.

Eykholt, et al., "Robust Physical-World Attacks on Deep Learning Models," arXiv:1707.08945, Apr. 2018.

Goodfellow, et al., "Explaining and harnessing adversarial examples," arXiv:1412.6572, Mar. 2015.

Miyato et al., "Virtual adversarial training: a regularization method for supervised and semi-supervised learning," arXiv:1704.03976, Jun. 2018.

Meng, et al., "MagNet: a Two-Pronged Defense against Adversarial Examples," arXiv:1705.09064, Sep. 2017.

Papernot, et al., "Distillation as a Defense to Adversarial Perturbations Against Deep Neural Networks," arXiv:1511.04508, Mar. 2016.

Zantedeschi, et al., "Efficient defenses against adversarial attacks," arXiv:1707.06728, Aug. 2017.

Carlini et al., "Adversarial Examples Are Not Easily Detected: Bypassing Ten Detection Methods," arXiv:1705.07263, Nov. 2017.

Carlini et al., "MagNet and 'Efficient Defenses Against Adversarial Attacks' are Not Robust to Adversarial Examples," arXiv:1711.08478, Nov. 2017.

Athalye et al., "Obfuscated gradients give a false sense of security: Circumventing defenses to adversarial examples," arXiv:1802.00420, Jul. 2018.

Response to Combined Search and Examination Report, Letter dated Nov. 17, 2022.

Combined Search and Examination Report, GB2115088.3, Apr. 7, 2022.

Response to German, Translation of Office Action Dated: Mar. 18, 2024, 14 Pages.

Xu et al, "Adversarial Attacks and Defenses in Images, Graphs and Text: A Review", International Journal of Automation and Computing, 17(2), Apr. 2020, 28 Pages.

\* cited by examiner

DETECTING ADVERSARY ATTACKS ON A DEEP NEURAL NETWORK (DNN)

BACKGROUND

Technical Field

This disclosure relates generally to information security and, in particular, to protecting machine learning models against wrongful reproduction, distribution and use.

Background of the Related Art

Machine learning technologies, which are key components of state-of-the-art Artificial Intelligence (AI) services, have shown great success in providing human-level capabilities for a variety of tasks, such as image recognition, speech recognition, and natural language processing, and others. Most major technology companies are building their AI products and services with deep neural networks (DNNs) as the key components. Building a production-level deep learning model is a non-trivial task, which requires a large amount of training data, powerful computing resources, and human expertise. For example, Google's Inception v4 model is a cutting edge Convolutional Neural Network (CNN) designed for image classification; creation of a model from this network takes from several days to several weeks on multiple GPUs with an image dataset having millions of images. In addition, designing a deep learning model requires significant machine learning expertise and numerous trial-and-error iterations for defining model architectures and selecting model hyper-parameters.

Despite their significant performance on many tasks, recent research has shown that DNNs are vulnerable to adversarial attacks, which attacks are designed to intentionally inject small perturbations (also known as "adversarial examples") to a DNN's input data to cause misclassifications. Such attacks are especially dangerous if the targeted DNN is being used in a critical application, such as autonomous driving, robotics, visual authentication and identification, and others. In one reported example, it was shown that an adversarial attack on an autonomous driving DNN model caused the target DNN to misclassify a stop sign as a speed limit, creating a dangerous driving condition.

Several forms of defense to adversarial attacks have also been proposed including adversarial training, input preprocessing, and different model hardening. Although these defenses make it harder for attackers to generate adversarial examples, it has been shown that these defenses are still vulnerable, and that they can still generate successful adversarial attacks.

Thus, there remains a need in the art to provide techniques to address adversarial attack that target deep neural networks.

BRIEF SUMMARY

The technique herein derives from an insight about the nature of adversarial attacks in general, namely, that such attacks typically only guarantee the final target label in the DNN, whereas the labels of intermediate representations are not guaranteed. According to this disclosure, this inconsistency is then leveraged as an indicator that an adversary attack on the DNN is present. A related insight is that, even for the last (output) DNN layer, an adversary attack only guarantees a target adversary label but ignores correlations among other intermediary (or secondary) predictions. This additional inconsistency is then utilized as a further (or secondary) indicator (or a confirmation) of the adversary attack. Accordingly, the approach herein preferably examines label and optional correlation consistency within the DNN itself to provide the attack indicator.

In a typical use case, the DNN is associated with a deployed system. Upon detecting the adversary attack, and according to a further aspect of this disclosure, a given action with respect to the deployed system is then taken. The nature of the given action is implementation-specific but includes, without limitation, issuing a notification/alerting, preventing the adversary from providing inputs that are determined to be adversarial inputs, taking an action to protect the deployed system, taking an action to re-train or otherwise protect (harden) the DNN, sandboxing the adversary, and so forth.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
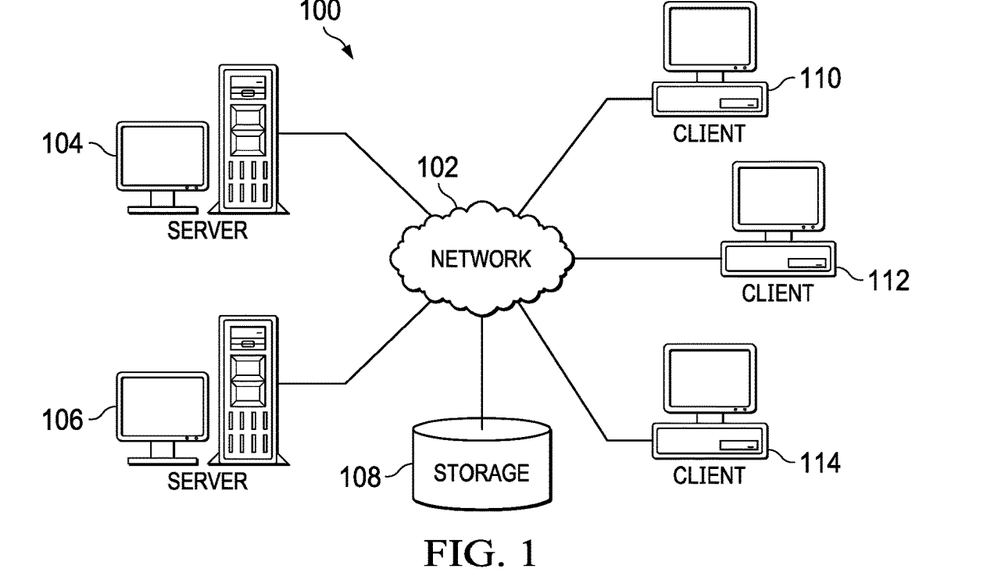
FIG. 1 depicts an exemplary block diagram of a distributed data processing environment in which exemplary aspects of the illustrative embodiments may be implemented.
Figure 2:
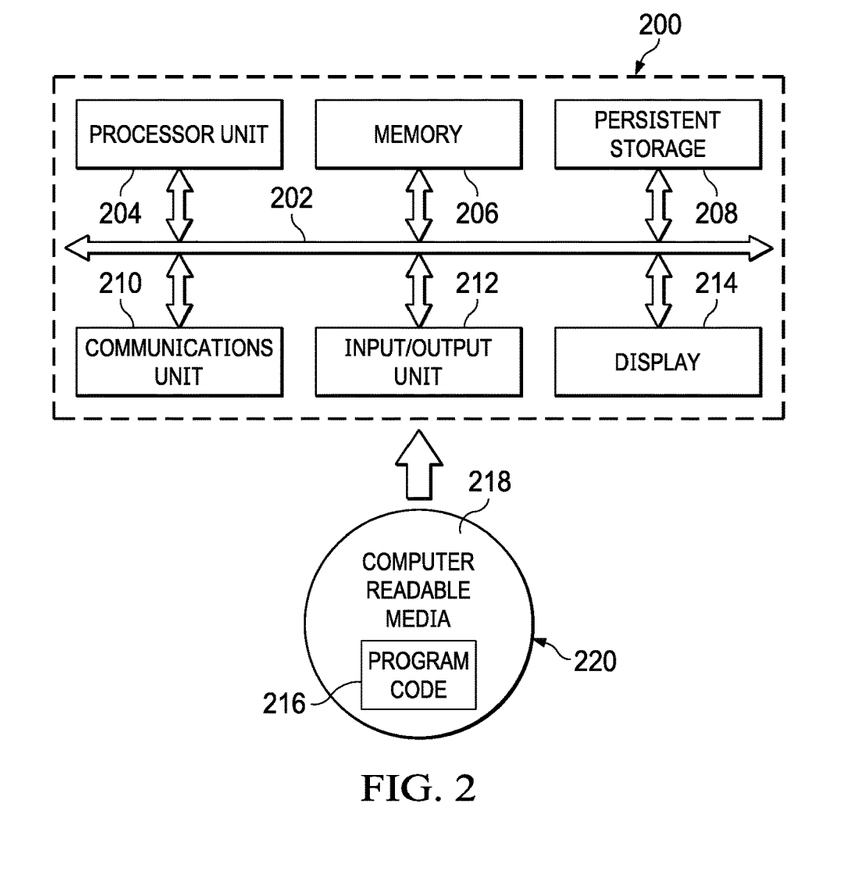
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Deep Neural Networks

By way of additional background, deep learning is a type of machine learning framework that automatically learns hierarchical data representation from training data without the need to handcraft feature representation. Deep learning methods are based on learning architectures called deep neural networks (DNNs), which are composed of many basic neural network units such as linear perceptrons, convolutions and non-linear activation functions. Theses network units are organized as layers (from a few to more than a thousand), and they are trained directly from the raw data to recognize complicated concepts. Lower network layers often correspond with low-level features (e.g., in image recognition, such as corners and edges of images), while the higher layers typically correspond with high-level, semantically-meaningful features.

Specifically, a deep neural network (DNN) takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit, etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters, $\theta$. More formally, let $D=\{x_i, z_i\}^T_{i=1}$ be the training data, where $z_i \in$ [0, n−1] is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data.

Formally, a DNN has been described in literature (Xu et al) by a function g: X→Y, where X is an input space, and Y is an output space representing a categorical set. For a sample x that is an element of X, $g(x)=f_{L-1}( \ldots ((f_1(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Figure 3:
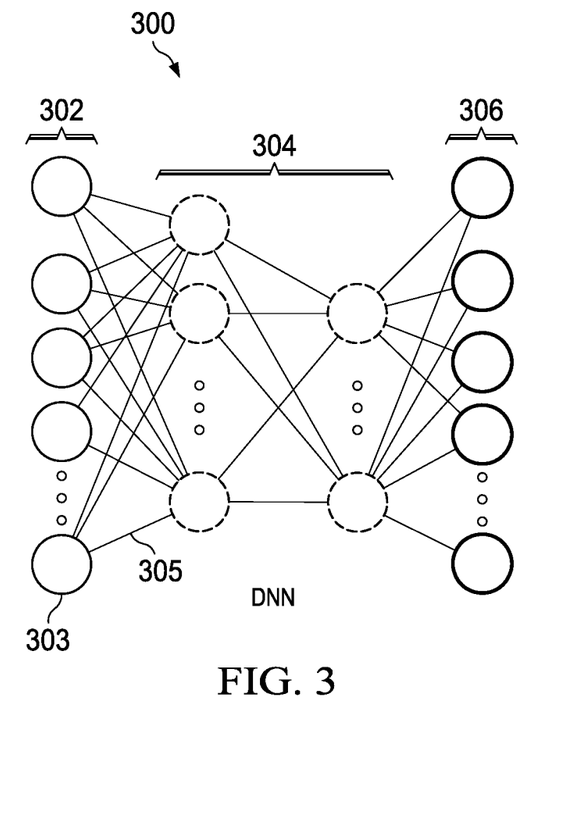
FIG. 3 depicts a DNN comprising a set of layers.

FIG. 3 depicts a representative DNN 300, sometimes referred to an artificial neural network. As depicted, DNN 300 is an interconnected group of nodes (neurons), with each node 303 representing an artificial neuron, and a line 305 representing a connection from the output of one artificial neuron to the input of another. In the DNN, the output of each neuron is computed by some non-linear function of the sum of its inputs. The connections between neurons are known as edges. Neurons and the edges typically have a weight that adjusts as learning proceeds. The weight increases or decreases the strength of the signal at a connection. As depicted, in a DNN 300 typically the neurons are aggregated in layers, and different layers may perform different transformations on their inputs. As depicted, signals (typically real numbers) travel from the first layer (the input layer) 302 to the last layer (the output layer) 306, via traversing one or more intermediate (the hidden layers) 304. Hidden layers 304 provide the ability to extract features from the input layer 302. As depicted in FIG. 3, there are two hidden layers, but this is not a limitation. Typically, the number of hidden layers (and the number of neurons in each layer) is a function of the problem that is being addressed by the network. A network that includes too many neurons in a hidden layer may overfit and thus memorize input patterns, thereby limiting the network's ability to generalize. On the other hand, if there are too few neurons in the hidden layer(s), the network is unable to represent the input-space features, which also limits the ability of the network to generalize. In general, the smaller the network (fewer neurons and weights), the better the network.

The DNN 300 is trained using a training data set, thereby resulting in generation of a set of weights corresponding to the trained DNN. Formally, a training set contains N labeled inputs where the $i^{th}$ input is denoted $(x_i, y_i)$. During training, parameters related to each layer are randomly initialized, and input samples $(x_i, y_i)$ are fed through the network. The output of the network is a prediction $g(x_i)$ associated with the $i^{th}$ sample. To train the DNN, the difference between a predicted output $g(x_i)$ and its true label, $y_i$, is modeled with a loss function, $J(g(x_i), y_i)$, which is back-propagated into the network to update the model parameters.

Figure 4:
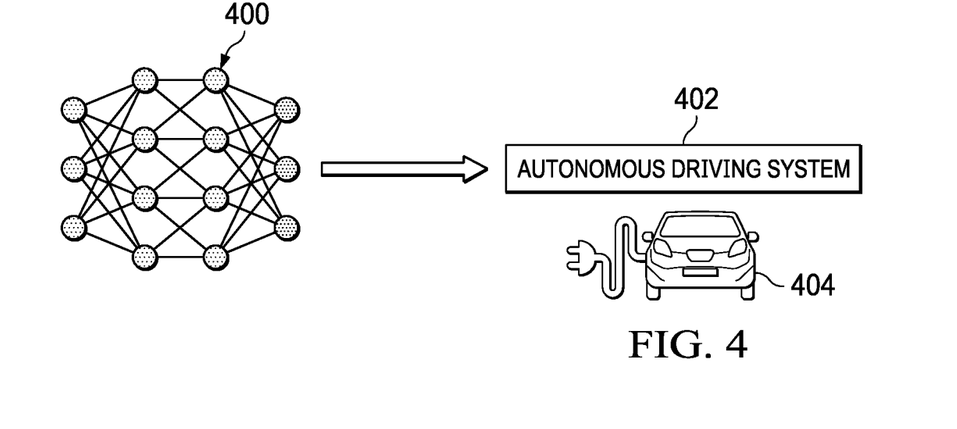
FIG. 4 depicts a DNN acting as a front-end of a controller of a deployed system.

FIG. 4 depicts a DNN 400 deployed as a front-end to a deployed system 402. In one example scenario, the deployed system is an autonomous driving system of an electric vehicle (EV) 404. An autonomous driving system is complex combination of various components or systems, and wherein perception, decision-making, and operation of the automobile are performed by electronics and machinery instead of a human driver. In this context, the DNN 400 typically is used for the perception (e.g., road and traffic visualization), as well as for decision-making during active operation of the vehicle. This use case is merely exemplary of a DNN-driven deployed system, but it should not be taken to limit this disclosure.

Threat Model

As used herein, an "adversarial input" is an input provided by an adversary with a goal of producing an incorrect output from a target classifier (DNN). Adversarial attacks have been the subject of research since Szegedy et al. discovered that neural networks are susceptible to adversarial samples. For example, Goodfellow et al propose the fast gradient sign method (FGSM), which is an untargeted attack that linearizes the cost function and solves for a perturbation that maximizes the cost subject to an $L_{infty}$ constraint to cause misclassifications. Moosavi-Dezfooli et al proposed Deep-Fool, an untargeted technique that searches for adversarial samples by minimizing the $L_2$ norm. Papernot et al presented the Jacobian-based saliency map approach (JSMA) for targeted adversarial image generation by iteratively perturbing image pixels having a high adversarial saliency score using a Jacobian gradient matrix of the DNN model. The goal of the attack is to increase the saliency score of the pixel for a target class. More recently, Carlini et al developed a new targeted gradient-based adversarial technique that utilize the $L_2$ norm. This approach has demonstrated much better success rates than existing approaches using minimal perturbations.

A Framework for Detecting Adversarial Attacks

With the above as background, the technique of this disclosure is now described. As described above, the technique derives from an insight about the nature of adversarial attacks in general, namely, that such attacks typically only guarantee the final target label in the DNN, whereas the labels of intermediate representations are not guaranteed. According to this disclosure, this inconsistency is then leveraged as an indicator that an adversary attack on the DNN is present. A related insight is that, even for the last (output) DNN layer, an adversary attack only guarantees a target adversary label but ignores correlations among other intermediate (or secondary) predictions. Typically, an intermediate prediction is one present at an intermediate (often hidden) layer within the DNN. This additional inconsistency is then utilized as a further (or secondary) indicator (or a confirmation) of the adversary attack. Accordingly, the detection technique preferably examines the DNN itself to provide the attack indicator.

In a typical use case, the DNN is associated with a deployed system. Upon detecting the adversary attack, a given action with respect to the deployed system is then taken. The nature of the given action is implementation-specific but includes, without limitation, issuing a notification, preventing the adversary from providing inputs that are determined to be adversarial inputs, taking an action to protect the deployed system, taking an action to re-train or otherwise protect (harden) the DNN, sandboxing the adversary, and so forth.

Figure 5:
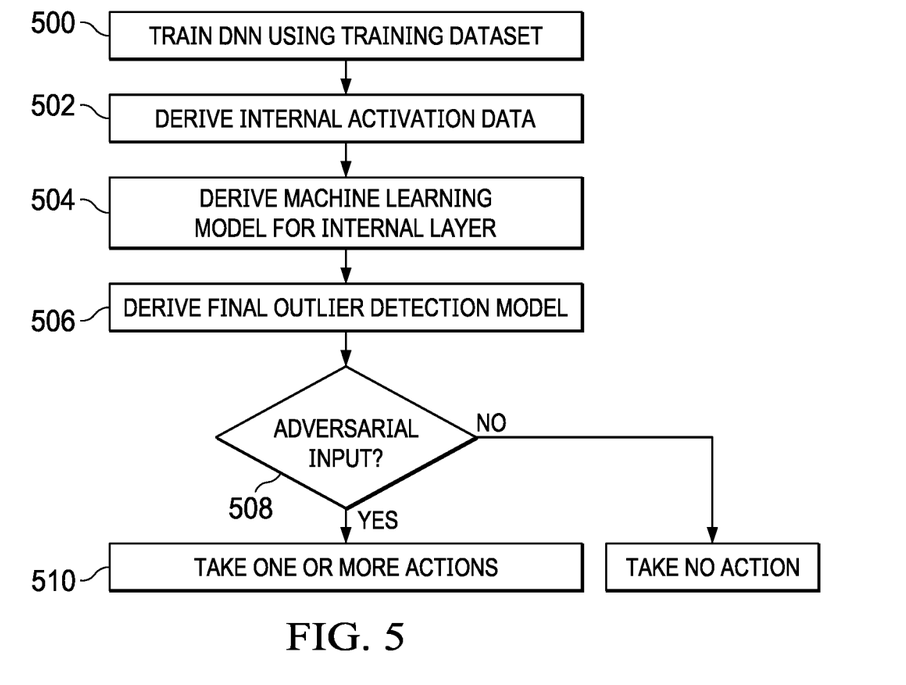
FIG. 5 depicts a process flow according to the technique of this disclosure an outlier detection model is generated by evaluating hidden layer consistency.

FIG. 5 depicts a process flow of the basic technique of this disclosure. The technique assumes the existence of a DNN, and an associated deployed system. In one embodiment, a method to detect an adversary attack on the DNN or, more generally, the deployed system, begins during training of the DNN. At step 500, training is initiated by feeding all (or substantially all) of a training dataset to the network. At step 502, an intermediate representation of each of a plurality of layers (the layer-wise activations) of the DNN is recorded. It is not required that an intermediate representation be recorded for each layer, and the intermediate representation for a particular layer may suffice. At step 504, and for each intermediate representation, and in one embodiment, a separate machine learning model (a classifier) is trained. The machine learning model determines the labels of each intermediate representation, and it may be implemented by a classification algorithm, such as k-nearest neighbor (k-NN), another DNN, or the like. In this embodiment, step 504 generates respective sets of label arrays for each intermediate representation, wherein a label array comprises a set of labels for the intermediate representation assigned by the machine learning model for different inputs. After respective label arrays are generated for the intermediate representations, at step 506 the respective sets of label arrays are then used to train an outlier detection model. The outlier detection model is trained to output a final class prediction, as well as an indicator regarding the presence or not of potential adversarial input. At step 508, and assuming an associated deployed system, a test may be performed to determine whether an adversary attack is detected for a given input or occurrence. If no adversary attack is detected, no action is taken. If, however, the outcome of step 508 indicates an adversary attack, the process continues at step 510 by taking an action in response to detection of the adversary attack. This completes the basic processing.

In an alternative embodiment, the layer-wise activations are computed and the separate machine learning model trained after the DNN is already trained. In such case, step 500 described above may be omitted.

The above-described technique is sometimes referred to herein as determining label consistency because the machine learning model generates the label arrays by evaluating inconsistency between the final target label and the label(s) of the intermediate representations. According to the approach herein, and among other advantages, internal label consistency provides a robust way to detect an adversarial attack that avoid the deficiencies and computational inefficiencies of known techniques, namely, adversarial training, input preprocessing, and different model hardening.

Figure 6:
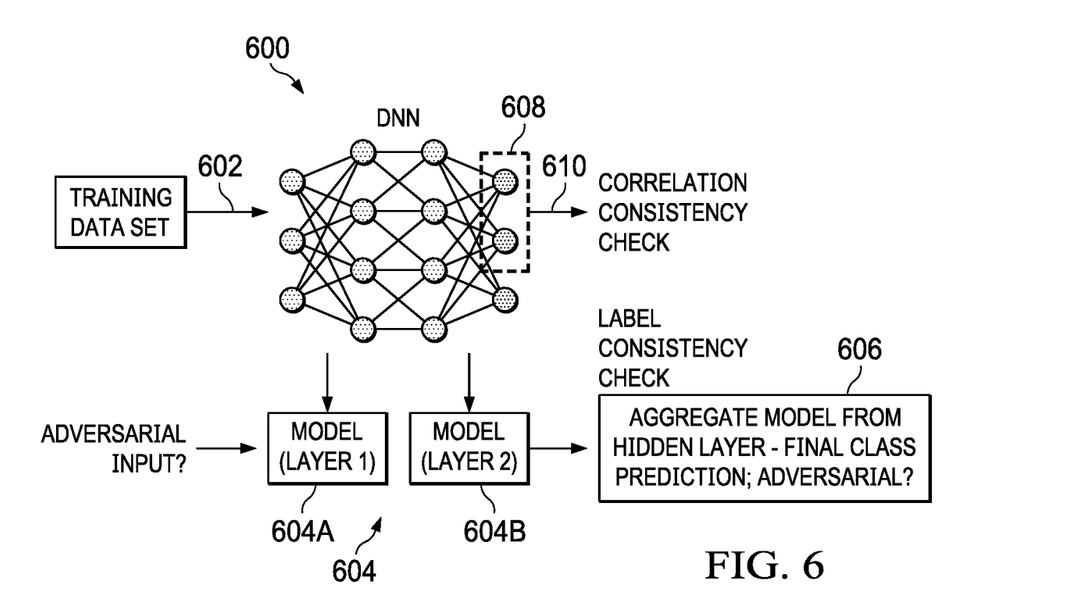
FIG. 6 provides a detailed depiction of a preferred technique for building an outlier detection model according to a preferred embodiment of this disclosure.

FIG. 6 depicts the above-described process for a DNN 600, once again in a non-limiting embodiment. As described, the DNN 600 receives a training data set 602. During training of the DNN with the training data set 602, one or more models 604 are then trained by evaluating the internal activations, namely, the respective state(s) of the intermediate (hidden) layers. As noted above, the training itself is not a requirement of this approach. Thus, and as depicted, the DNN has a first hidden layer (layer 1), and the internal activations (state) for that layer are modeled by model 604A. More formally, for each input i, a label array $[l_{i1}, l_{i2}, \ldots l_{in}]$ is generated, wherein $l_{in}$ represents the label of input i at the $n^{th}$ layer. In this example, the DNN also has a second hidden layer (layer 2), and the internal activations (state) for that layer are modeled by model 604B. Preferably, although not required, the models 604A and 604A are integrated into an aggregate model or classifier 606. The classifier corresponds to the outlier detection model described above in the FIG. 5 process flow. Classifier 606, which has been trained derivatively from the original training data set 602 and the labels defined by the one or more models 604, then provides a classification as its output. As noted, typically the classification is a prediction (of the aggregate prediction of the internal states) for a particular data input, as well as an indication of whether that input is an adversarial input.

As noted, the DNN typically includes many additional intermediate (hidden) layers. Each intermediate layer may have an associated model 604, but this is not a requirement. Individual ones of the models may be used as well for the prediction and adversarial input classification provided by the model 606 in the preferred approach. In other words, preferably the classifier acts based on the aggregate internal activation knowledge embedded in models 604.

FIG. 6 also depicts a further optimization, which is sometimes referred to herein as a correlation consistency check. In particular, there may be one or more neurons in the DNN's last layer than are determined or seen to be overly-sensitive to perturbations. Thus, according to this example embodiment, it is assumed that one of the neurons 608 in the last layer of the DNN 600 is such a neuron. According to this optimization, that neuron is deactivated/ignored, and the values of the remaining neurons in the last layer are used to train a separate classifier (or to augment the classifier 606) to provide a further correlation consistency check for the adversarial input(s). Essentially, this classifier will classify the input data based on the correlation among other labels. If the real label is different from the label from the trained classifier, the input data has a high possibility to be an adversary attack.

Thus, and as has been described, the technique herein preferably detects adversary attacks using the labels of intermediate (layer) representations (having been trained using the original training dataset), and the technique takes advantage of the notion that inconsistencies between the final target label and the labels of intermediate representations (that are present following training) also can provide a useful indicator regarding subsequent receipt by the DNN of an adversary input. In addition, and because even for the last DNN layer an adversary attack only guarantees a target adversary label, the technique preferably also examines correlations among other labels (in the last layer) for certain neurons to provide a further indication of an adversary attack. Thus, the technique herein leverages model label consistency across layers, and (optionally) correlation consistency 610 across labels in the last layer as adversary attack indicators.

More generally, the technique herein is complementary to existing defense systems.

One or more aspects of this disclosure (e.g., the initial DNN training to produce the outlier detection model) may be implemented as-a-service, e.g., by a third party. The subject matter may be implemented within or in association with a data center that provides cloud-based computing, data storage or related services.

In a typical use case, a SIEM or other security system has associated therewith an interface that can be used to issue API queries to the trained model and its associated outlier detection model, and to receive responses to those queries including responses indicator of adversarial input. The client-server architecture as depicted in FIG. 1 may be used for this purpose.

The approach herein is designed to be implemented on-demand, or in an automated manner.

Access to the service for model training or use to identify adversarial input may be carried out via any suitable request-response protocol or workflow, with or without an API.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the techniques described herein are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, execution threads, and the like.

The techniques herein provide for improvements to another technology or technical field, e.g., deep learning systems, other security systems, as well as improvements to deployed systems that use deep neural networks to facilitate command and control operations with respect to those deployed systems.

The techniques described herein are not limited for use with a deep neural network (DNN) model. The approach may be extended to any machine learning model including, without limitation, a Support Vector Machine (SVM), a logistical regression (LR) model, and the like, that has internal processing states (namely, hidden weights), and the approach may also be extended to use with decision tree-based models.

Having described the subject matter, what we claim is as follows:

1. A method to protect a deep neural network (DNN) having a plurality of layers including one or more intermediate layers, comprising:
    recording one or more representations of activations, wherein each recorded representation of activations is associated with a respective intermediate layer of the one or more intermediate layers;
    for each of the one or more representations of activations, training a separate classifier;
    following training of separate classifiers for the one or more representations of activations, using the separate classifiers trained from the one or more representations of activations to detect an adversarial input on the deep neural network;
    de-activating one or more neurons at a last DNN layer;
    using a set of values from one or more remaining neurons in the last DNN layer to generate an additional classifier; and
    using the additional classifier to confirm detection of the adversarial input.

2. The method as described in claim 1, wherein training a classifier, of the separate classifiers, generates a set of label arrays, a label array being a set of labels for a representation of activations associated with an intermediate layer.

3. The method as described in claim 2, wherein using the separate classifiers further includes aggregating respective sets of label arrays into an outlier detection model.

4. The method as described in claim 3, wherein the outlier detection model generates a prediction, together with an indicator, that indicates whether a given input is the adversarial input.

5. The method as described in claim 4, further including taking an action in response to detection of the adversarial input.

6. The method as described in claim 5, wherein the action is one of: issuing a notification, preventing an adversary from providing one or more additional inputs that are determined to be adversarial inputs, taking an action to protect a deployed system associated with the DNN, taking an action to retrain or harden the DNN.

7. An apparatus, comprising:
    a processor;
    computer memory holding computer program instructions executed by the processor to protect a deep neural network (DNN) having a plurality of layers including one or more intermediate layers, the computer program instructions configured to:
        record one or more representations of activations, wherein each recorded representation of activations is associated with a respective intermediate layer of the one or more intermediate layers;
        for each of the one or more representations of activations, train a separate classifier;
        following training of separate classifiers for the one or more representations of activations, use the separate classifiers trained from the one or more representations of activations to detect an adversarial input on the deep neural network;
        de-activate one or more neurons at a last DNN layer;

use a set of values from one or more remaining neurons in the last DNN layer to generate an additional classifier; and use the additional classifier to confirm detection of the adversarial input.

8. The apparatus as described in claim 7, wherein training a classifier, of the separate classifiers, generates a set of label arrays, a label array being a set of labels for a representation of activations associated with an intermediate layer.

9. The apparatus as described in claim 8, wherein the computer program instructions configured to use the separate classifiers further includes computer program instruction configured to aggregate respective sets of label arrays into an outlier detection model.

10. The apparatus as described in claim 9, wherein the computer program instructions further include computer program instructions configured using the outlier detection model to generate a prediction, together with an indicator, that indicates whether a given input is the adversarial input.

11. The apparatus as described in claim 10, wherein the computer program instructions include computer program instructions further configured to take an action in response to detection of the adversarial input.

12. The apparatus as described in claim 11, wherein the action is one of: issuing a notification, preventing an adversary from providing one or more additional inputs that are determined to be adversarial inputs, taking an action to protect a deployed system associated with the DNN, taking an action to retrain or harden the DNN.

13. A computer program product in a non-transitory computer readable medium for use in a data processing system to protect a deep neural network (DNN) having a plurality of layers including one or more intermediate layers, the computer program product holding computer program instructions that, when executed by the data processing system, are configured to:

record one or more representations of activations, wherein each recorded representation of activations is associated with a respective intermediate layer of the one or more intermediate layers;

for each of the one or more representations of activations, train a separate classifier;

following training of separate classifiers for the one or more representations of activations, use the separate classifiers trained from the one or more representations of activations to detect an adversarial input on the deep neural network;

de-activate one or more neurons at a last DNN layer;

use a set of values from one or more remaining neurons in the last DNN layer to generate an additional classifier; and use the additional classifier to confirm detection of the adversarial input.

14. The computer program product as described in claim 13, wherein training a classifier, of the separate classifiers, generates a set of label arrays, a label array being a set of labels for a representation of activations associated with an intermediate layer.

15. The computer program product as described in claim 14, wherein the computer program instructions configured to use the separate classifiers further includes computer program instruction configured to aggregate respective sets of label arrays into an outlier detection model.

16. The computer program product as described in claim 15, wherein the computer program instructions further include computer program instructions configured using the outlier detection model to generate a prediction, together with an indicator, that indicates whether a given input is the adversarial input.

17. The computer program product as described in claim 16, wherein the computer program instructions include computer program instructions further configured to take an action in response to detection of the adversarial input.

18. The computer program instructions as described in claim 17, wherein the action is one of: issuing a notification, preventing an adversary from providing one or more additional inputs that are determined to be adversarial inputs, taking an action to protect a deployed system associated with the DNN, taking an action to retrain or harden the DNN.

* * * * *